US009774186B2

(12) United States Patent
Anderson et al.

(10) Patent No.: US 9,774,186 B2
(45) Date of Patent: Sep. 26, 2017

(54) POWER SUPPLY SYSTEM WITH MULTIPLE OUTPUT PORTS AND ASSOCIATED METHODS FOR OUTPUT PORT POWER MANAGEMENT

(71) Applicant: GOOGLE TECHNOLOGY HOLDINGS LLC, Mountain View, CA (US)

(72) Inventors: Wayne G. Anderson, Dacula, GA (US); Robert M. Johnson, Lake Zurich, IL (US); Daniel S. Rokusek, Long Grove, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 650 days.

(21) Appl. No.: 14/294,409

(22) Filed: Jun. 3, 2014

(65) Prior Publication Data
US 2015/0277461 A1 Oct. 1, 2015

Related U.S. Application Data

(60) Provisional application No. 61/972,506, filed on Mar. 31, 2014.

(51) Int. Cl.
*H02J 1/14* (2006.01)
*H02M 1/32* (2007.01)
(52) U.S. Cl.
CPC ......... *H02J 1/14* (2013.01); *H02M 2001/325* (2013.01); *Y10T 307/414* (2015.04)
(58) Field of Classification Search
CPC .................................................... H02J 1/14

USPC .......................................................... 307/32
See application file for complete search history.

(56) References Cited

U.S. PATENT DOCUMENTS

| 7,781,908 B2 | 8/2010 | DuBose et al. |
| 8,319,470 B2 | 11/2012 | English et al. |
| 2009/0015064 A1* | 1/2009 | Huang .................. H02H 7/268 307/21 |

* cited by examiner

*Primary Examiner* — Joseph Chang
(74) *Attorney, Agent, or Firm* — Morris & Kamlay LLP

(57) ABSTRACT

A power supply system is operable to contemporaneously supply power to multiple output ports when available power from a power source is insufficient to meet maximum potential power requirements of load devices coupled to the output ports. The power supply system includes a system monitor, multiple power converters, and optional temperature sensing circuits, where each power converter supplies power to a respective output port. The system monitor monitors an output power characteristic of the power source, output powers delivered to the output ports, and/or temperatures detected by the temperature sensing circuits. When the system monitor detects an overload condition is approaching based on the monitored parameter or parameters, the system monitor generates control signals which cause the power converters to maintain or reduce their output powers such that the overload condition is abated and two or more output ports continue to deliver output power to their respective load devices.

37 Claims, 5 Drawing Sheets

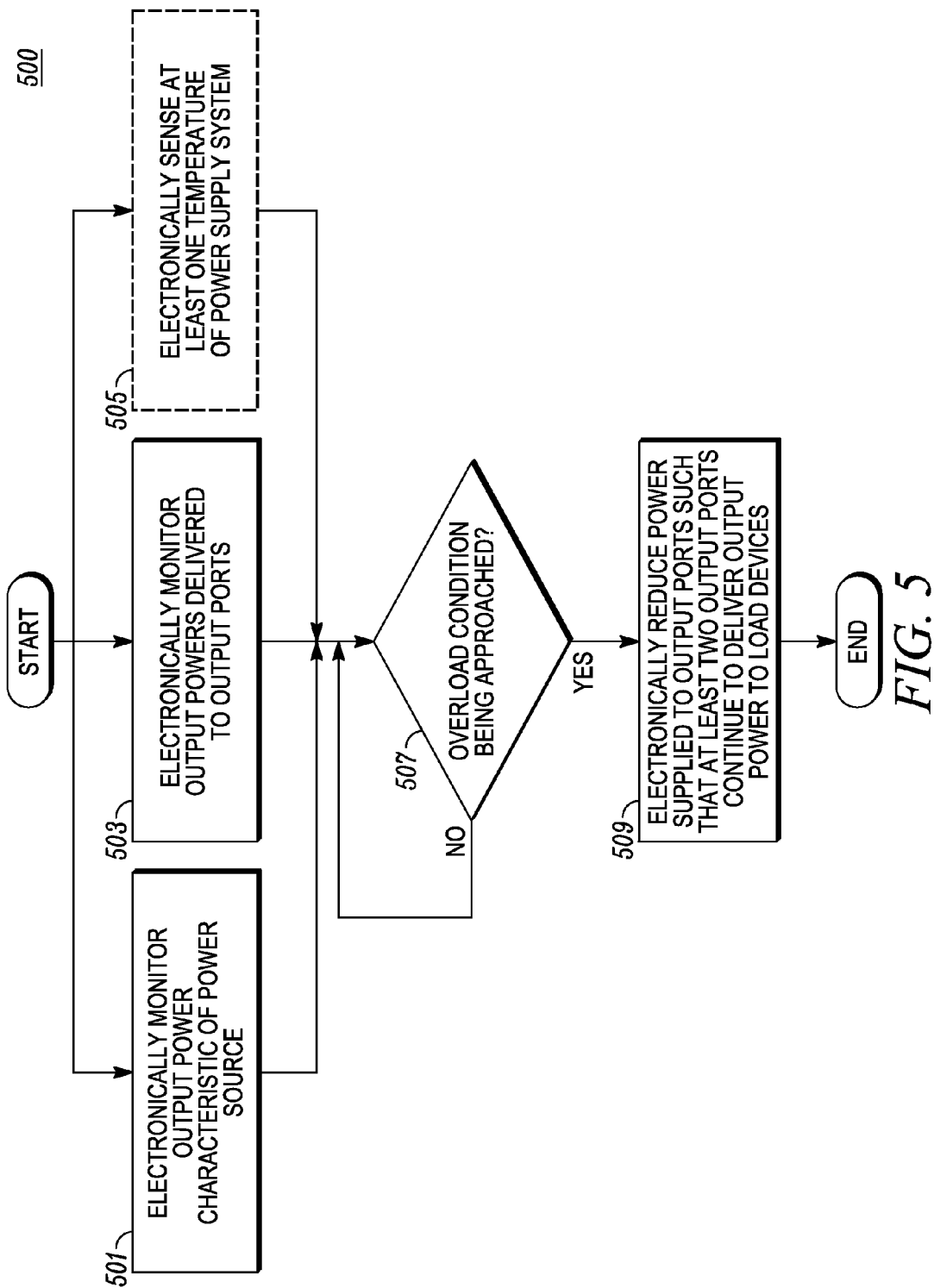

POWER SUPPLY SYSTEM WITH MULTIPLE OUTPUT PORTS AND ASSOCIATED METHODS FOR OUTPUT PORT POWER MANAGEMENT

TECHNICAL FIELD

The present disclosure relates generally to power supply systems and, more particularly, to a power supply system with multiple output ports and to associated operational methods for contemporaneously supplying power to the multiple output ports responsive to an approaching overload or over power condition.

BACKGROUND

A variety of power supplies exist to facilitate recharging of portable electronic devices. Such power supplies typically receive alternating current (AC) power from a wall socket or other AC power source and supply direct current (DC) power for use by the portable electronic devices, such as smartphones, tablet computers, portable multi-media device, laptop computers, portable gaming systems, or other portable electronic devices.

Some power supplies include multiple output ports, such as Universal Serial Bus (USB) ports, to enable the power supply to charge multiple load devices simultaneously (e.g., smartphone and tablet computer, smartphone and portable gaming device, tablet computer and portable multi-media device, and so forth). Such multi-port supplies are either designed to support the maximum amount of power that may be cumulatively requested by the load devices or, when not so designed, may become unstable under overload conditions. Designing the power supply for maximum possible aggregate load adds unnecessary size and expense, especially where the power supply may not be asked often to supply maximum power to all output ports. On the other hand, failing to design the power supply to handle maximum load may cause one or more of the output voltages to enter a loop in which the output voltage repeatedly drops to zero and then attempts to recover to full value so long as the cumulative power demand from the load devices is in excess of the aggregate power available from the supply. The supply of such a looping output voltage may cause a connected load device to repeatedly reboot or otherwise act erratically, and could ultimately damage the device and/or cause a bad consumer experience.

One proposal for managing power supplied to the two output ports of a dual output power converter when an overload condition is present is described in U.S. Pat. No. 7,781,908 B2. According to this proposal, one output port is identified as being a high power output and the other output port is identified as being a low power output. During operation of the power converter, the output power delivered to the high power output is monitored. If the power delivered to the high power output remains below a threshold for a period of time, the low power output is activated. If the power delivered to the high power output later exceeds the threshold for a period of time, an electronic circuit powers down the low power output (i.e., turns off or deactivates the low power output) in order to keep the total output power below the rated power for the power converter. After a period of time, the power drawn by the high power output is checked again and, if the drawn power has dropped below the threshold, the low power output may be reactivated. If the power drawn by the high power output exceeds the rated power for the power converter, both the high power output and the low power output are turned off and the converter must be unplugged from its power source.

The output power management approach disclosed in U.S. Pat. No. 7,781,908 B2 provides a binary approach to power management, whereby power ceases to be delivered to at least the low power output when the power converter is in an over power or overload condition. Thus, if a portable electronic device is coupled to the low power output port when an overload condition arises, the portable electronic device may reboot or otherwise act erratically in response to a loss of source power, thereby causing a bad consumer experience.

BRIEF DESCRIPTION OF THE DRAWINGS

FIG. 5 illustrates a logic flow diagram of steps performed by a power supply system to manage the supply of output power to multiple output ports, in accordance with a further exemplary embodiment of the present disclosure.

Figure 1:
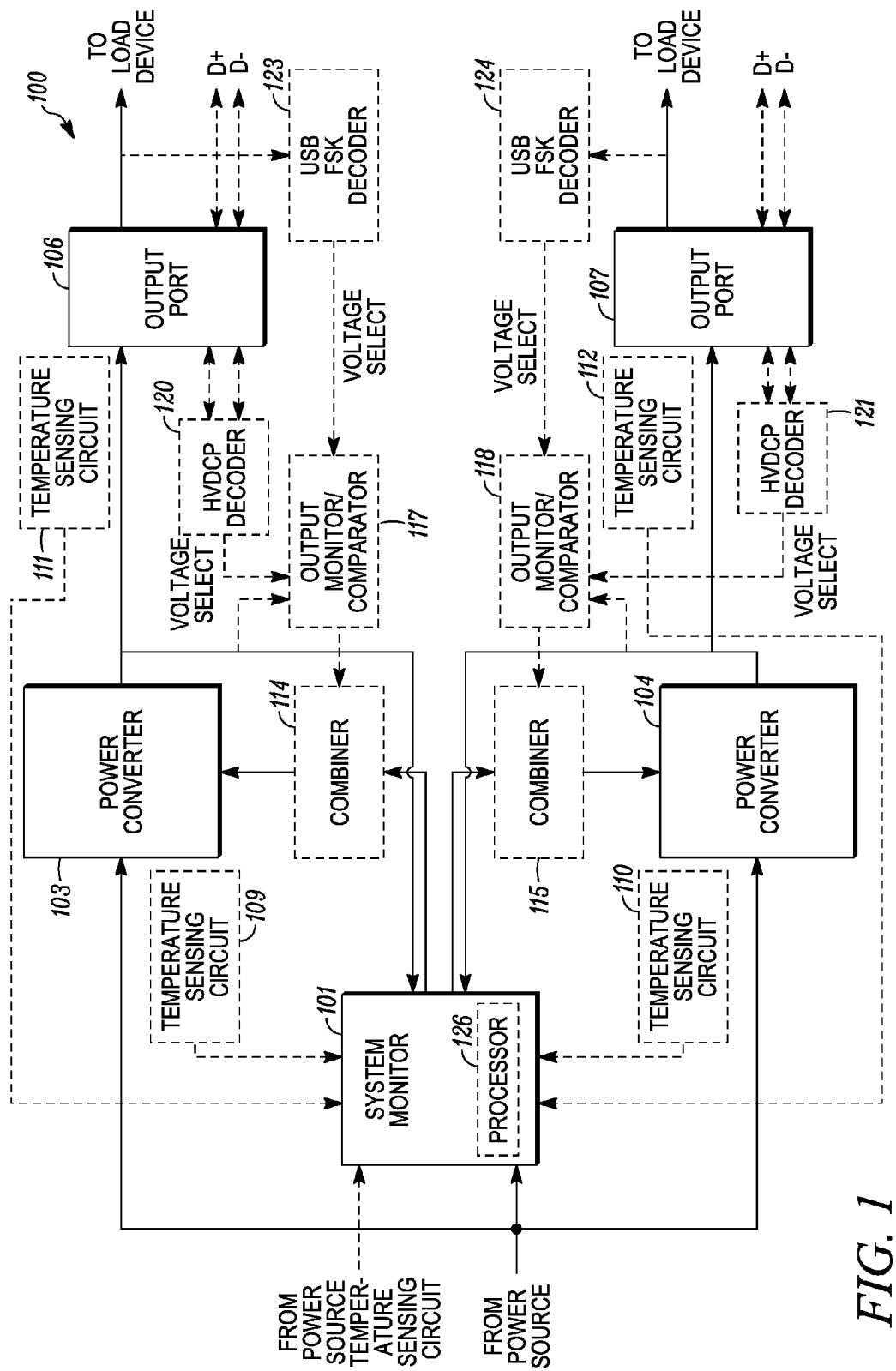
FIG. 1 illustrates an electrical block diagram of a power supply system, in accordance with several exemplary embodiments of the present disclosure.

Skilled artisans will appreciate that elements in the figures are illustrated for simplicity and clarity and have not necessarily been drawn to scale. For example, the dimensions of some of the elements in the figures may be exaggerated alone or relative to other elements or the elements may be shown in block diagram form to help improve the understanding of the various exemplary embodiments described herein.

DETAILED DESCRIPTION

Generally, the present disclosure relates to a power supply system with multiple output ports and to associated operational methods for contemporaneously supplying power to the multiple output ports in response to an approaching or impending overload/over power condition. According to one embodiment, the power supply system includes a system monitor and at least two power converters operably coupled to the system monitor and respective output ports. The system monitor is operable to: monitor one or more output power characteristics of the power source and/or output powers delivered to the multiple output ports; determine whether an overload condition is being approached based on the monitoring results; and generate control signals in response to determining that an overload condition is being approached. The monitored output power characteristics of the power source may include one or more of output voltage, output current, and output power. Each power converter is coupled to a respective output port and operable to convert power supplied by the power source into a respective output power at an associated output voltage during normal operation of the power supply system. At least two of the power converters are also operable to convert power supplied by the power source into either their respective normal operation output powers or lesser, non-zero output powers at either their respective normal operation output voltages or lesser output voltages in response to one or more control signals from the system monitor. Control of the power converters in such a manner results in abatement of the overload condition, while continuing power delivery to load devices coupled to two or more of the output ports. In other words, unlike existing approaches that deactivate all but one output port (e.g., a high power output port) in response to detecting an overload condition, the approach disclosed herein reduces output powers at one or more output ports, when necessary to abate an overload condition, while still maintaining at least a minimum required level of output power at two or more of the output ports.

According to one alternative embodiment, the system controller may be processor-based and operable in accordance with operating instructions (e.g., a computer program) stored in memory accessible by the processor. Alternatively or additionally, the system controller may include appropriately arranged electronic circuits to perform some or all of the controller's monitoring, overload determination, and control signal generation functions.

For example, according to one embodiment, the system controller may include an output characteristic monitoring circuit, a differential amplifier circuit, and multiple isolation amplifier circuits (one isolation amplifier circuit for each power converter). The output characteristic monitoring circuit is operable to monitor at least one output characteristic of the power source and produce an output voltage responsive thereto. The differential amplifier circuit is operable to produce an output voltage corresponding to a difference between the output voltage produced by the output characteristic monitoring circuit and a reference voltage. The output voltage of the differential amplifier circuit is indicative of whether an overload condition is being approached based on the output characteristic(s) of the power source. Each isolation amplifier circuit is operable to supply the output voltage of the differential amplifier circuit to a power control input of an associated power converter. The power control input of the power converter controls an amount of output power supplied by the power converter. For example, the power control input of the power converter may be the feedback input of the power converter, where the power converter is a solid-state buck converter.

According to another embodiment, the system controller may include an output characteristic monitoring circuit, a differential amplifier circuit, and multiple voltage-controlled resistance circuits (one voltage-controlled resistance circuit for each power converter). The output characteristic monitoring circuit is operable to monitor at least one output characteristic of the power source and produce an output voltage responsive thereto. The differential amplifier circuit is operable to produce an output voltage corresponding to a difference between the output voltage produced by the output characteristic monitoring circuit and a reference voltage. The output voltage of the differential amplifier circuit is indicative of whether an overload condition is being approached based on the output characteristic(s) of the power source. Each voltage-controlled resistance circuit is operable to select a resistance applied to a power control input of an associated power converter based on the output voltage of the differential amplifier circuit. For example, but not by way of limitation, each voltage-controlled resistance circuit may selectively connect one or more resistors between the power control input of the associated power converter and ground based on the output voltage of the differential amplifier. The power control input of the power converter controls an amount of output power supplied by the power converter. According to one exemplary embodiment, the power control input of the power converter may be the current set resistor input of the power converter, where the power converter is a solid-state buck converter.

According to a further embodiment, the power supply system may include one or more temperature sensing circuits operable to detect temperatures of the power supply system. The temperatures detected by the temperature sensing circuit or circuits may include, but are not limited to, temperatures proximate the power converters, temperatures proximate the output ports, and a temperature proximate the power source. In this embodiment, the system monitor may be processor-based and operable to determine whether an overload condition is being approached based in whole or in part on the detected temperatures. For example, the system monitor may determine that an overload condition is being approached when a detected temperature exceeds an associated temperature threshold. Alternatively, the system monitor may determine that an overload condition is being approached when a detected temperature exceeds an associated temperature threshold and a summation of values representing the monitored output powers delivered to the output ports exceeds an output power threshold. Further, the system monitor may determine that an overload condition is being approached when a detected temperature exceeds an associated temperature threshold and a value of a monitored output power characteristic of the power source is undesirable relative to an associated power characteristic threshold.

According to a further embodiment in which two or more of the power converters electronically reduce their respective output powers in response to control signals from the system monitor, the reductions in output power may be proportionate or disproportionate to one another. In other words, each power converter may reduce its output power by the same amount or by different amounts, as instructed by the system monitor. Reduction in output power may be accomplished by reducing the voltages and/or currents supplied by the power converters to the output ports.

Alternatively, only one power converter may be instructed to reduce its output power in cases where such a reduction would eliminate the overload condition and still enable sufficient power to be delivered to a load device coupled to an output port supplied by the affected power converter. For example, the system monitor may be programmed to first determine whether power may be reduced at only one output port to avoid the overload condition without detrimentally affecting a load device coupled to that port. If reduction of power at one output port would not eliminate the overload condition without detrimentally affecting a load device, then the system monitor may control the power converters to reduce the output powers at multiple output ports.

According to yet another embodiment, a method is provided for contemporaneously supplying power to two or more output ports when available power from a power source is insufficient to meet maximum potential power requirements of load devices coupled to the output ports. One or more output power characteristics of the power source and/or output powers delivered to the output ports are electronically monitored, such as by a processor or through the use of analog circuitry. The monitored output power characteristics of the power source and/or output powers delivered to the output ports are then used to electronically determine (again through use of a processor or analog circuitry) whether an overload condition is being approached. When the determination is made that an overload condition is being approached, an amount of power supplied to the output ports is electronically reduced, such that the overload condition is abated and two or more of the output ports continue to deliver output power to respective load devices. Reduction of output power supplied to the output ports may be accomplished by reducing voltages and/or currents supplied to the output ports. The reduction of output power may be proportionate or disproportionate between output ports, provided that the power supplied to at least two of the output ports is greater than zero and, more preferably, sufficient to allow load devices coupled to the output ports to operate without performance degradation that may be considered unacceptable by users of the load devices. According to one embodiment, output power may be reduced to only one output port provided that the output power remains greater than zero and, more preferably, sufficient to allow a load device coupled to the output port to operate without unacceptable performance degradation (e.g., without having to reboot or otherwise unacceptably change its current operating state).

Where one or more output characteristics of the power source are monitored (sometimes referred to herein as "upstream monitoring"), a value of each monitored output power characteristic may be compared to a respective threshold and an overload condition may be determined to be approaching based on the value of the monitored output power characteristic relative to the threshold. For example, where the monitored output power characteristic of the power source is output voltage, an overload condition may be determined to be approaching when the value of the power source's output voltage decreases below a minimum voltage threshold. On the other hand, where the monitored output power characteristic of the power source is output current, an overload condition may be determined to be approaching when the value of the power source's output current increases above a maximum current threshold.

Alternatively, instead of comparing a value of each monitored output power characteristic of the power source to a respective threshold, values of each output power characteristic may be monitored over time to compute a slope of the output power characteristic. In this case, a determination as to whether an overload condition is being approached may be made based on the slope of the particular output power characteristic. For example, where the monitored output power characteristic of the power source is output voltage, an overload condition may be determined to be approaching when the slope of the power source's output voltage is decreasing, or decreasing at a rate greater than a threshold rate. On the other hand, where the monitored output power characteristic of the power source is output current, an overload condition may be determined to be approaching when the slope of the power source's output current is increasing, or increasing at a rate greater than a different threshold rate.

Alternatively, where the output powers delivered to the output ports are monitored (sometimes referred to herein as "downstream monitoring"), values representing monitored output powers delivered to the output ports may be summed to produce a summation. The summation may be compared to a threshold and an overload condition may be determined to be approaching when the summation exceeds the threshold. According to one embodiment, the threshold may be equal to a value representing a predetermined portion of the available power (e.g., 90-95% of the available power). Alternatively, the threshold may be equal to a value representing substantially all of the available power (e.g., 95-100% of the available power).

Still further, where both upstream and downstream monitoring are performed, an overload condition may be determined to be approaching when either the value of a monitored output power characteristic of the power source has degraded relative to a respective threshold or otherwise, or the sum of monitored output powers delivered to the output ports has risen above its respective threshold. Thus, a combination of monitoring may be performed to capture various overload condition indicators.

In yet another embodiment, the overload detection monitoring scheme may be based solely or partially on temperature detection. In such a case, one or more temperatures may be electronically sensed or detected for a power supply system that is supplying the power to the output ports. Where temperature detection is the primary overload detection mechanism, one or more temperatures for the power supply system may be detected and compared to associated temperature thresholds. When a detected temperature exceeds an associated temperature threshold, an overload condition may be determined to be approaching. Where temperature detection is only part of the overload detection scheme, the determination of whether an overload condition is being approached may be based on at least one of (a) one or more monitored output power characteristics of the power source, (b) monitored output powers delivered to the output ports, and (c) at least one detected temperature. For example, detected temperatures may be compared to associated thresholds in addition to evaluating output power characteristics of the power source and/or output powers delivered to the output ports. In such as case, where a detected temperature exceeds an associated threshold, an output power characteristic of the power source has degraded unacceptably (e.g., relative to an associated power characteristic threshold), and/or the sum of monitored powers exceeds a power threshold, a system monitor or other functionally equivalent device or software process may determine that an overload condition is being approached.

By configuring and operating a power supply system as disclosed herein to monitor for an approaching overload condition and proactively take overload abatement measures, power can continue to be supplied to load devices coupled to the output ports of the power supply system without impacting the performance of the load devices in an unacceptable manner. Thus, instead of deactivating all but a high power or high priority output port when an overload condition is reached, the process disclosed herein allows power to be contemporaneously supplied to multiple output ports while avoiding or abating an overload or over power condition.

Exemplary embodiments of a power supply system and its output port power management methods can be more readily understood with reference to FIGS. 1-5, in which like reference numerals designate like items. In FIGS. 1 and 5, optional components, sensing and control lines, and process steps are generally shown in dashed form, while components, sensing and control lines, and process steps which are generally more preferable (although not necessarily required) are shown in solid form. Nevertheless, those of ordinary skill in the art will appreciate that some sensing and control lines, components, and/or process steps generally shown in solid form may be considered to be optional when the figures are considered in combination with their respective descriptions as set forth below. For example, as will be explained in more detail below, the components, sensing and control lines, and process steps relating to both upstream and downstream monitoring are shown in solid lines in FIG. 1 because a combined monitoring approach is preferred, though not required.

FIG. 1 illustrates an electrical block diagram of a power supply system 100, in accordance with several exemplary embodiments of the present disclosure. According to one more preferable embodiment, the power supply system 100 includes a system monitor 101, a plurality of power converters 103-104 (two shown for illustrative purposes), and a plurality of output ports 106-107 (two also shown for illustrative purposes). In one or more alternative embodiments, the power supply system 100 may include one or more temperature sensing circuits 109-112 (four shown for illustrative purposes) and pluralities of combiners 114-115, output monitors/comparators 117-118, high voltage dedicated charging port (HVDCP) decoders 120-121, and Universal Serial Bus (USB) frequency shift keying (FSK) decoders 123-124 (two of each shown for illustrative purposes). Where the output ports 106-107 are USB ports, the ports 106-107 may support the use of USB data lines (D+, D−) and communication using the HVDCP protocol over such data lines, as is conventional in the art.

The system monitor 101 may include a processor 126 and/or appropriate analog and/or digital circuitry programmed or otherwise configured to enable the system monitor 101 to monitor certain operating performance of the power supply system 100 which enables the system monitor 101 to determine whether an overload or over power condition is being approached. For example, the system monitor 101 may include a processor 126 programmed to monitor one or more output power characteristics of a power source, monitor output powers delivered by the power converters 103-104 to the output ports 106-107, and/or outputs of the temperature sensing circuits 109-112. In such as case, the system monitor 101 may also include memory (not shown) in which the program instructions executable by the processor 126 are stored. Alternatively or additionally, the system monitor 101 may include analog and/or digital circuitry providing a hardware implementation for monitoring one or more output power characteristics of the power source, output powers delivered by the power converters 103-104 to the output ports 106-107, and/or output data from the temperature sensing circuits 109-112. Exemplary analog hardware implementations of the system monitor 101 or the portion used thereof used for monitoring output characteristics of the power source are discussed below with respect to FIGS. 2 and 3.

Where the system monitor 101 is processor-based, the processor 126 may be implemented using one or more microprocessors, one or more microcontrollers, one or more digital signal processors (DSPs), one or more digital signal controllers, one or more state machines, logic circuitry, or any other device or combination of devices that processes information and generates control signals based on operating or programming instructions stored in memory accessible by the processor 126. One of ordinary skill in the art will readily recognize and appreciate that the processor 126 may include its own embedded memory for storing the operating instructions.

According to one embodiment, the system monitor 101 is coupled to an output of a power source, such as an alternating current-to-direct current converter (AC-to-DC converter), a DC-to-DC converter, or an AC-to-AC converter, to facilitate monitoring of one or more characteristics of the power source output. According to another embodiment, the system monitor 101 may be alternatively or additionally coupled to the outputs of the power converters 103-104 to allow the system monitor 101 to monitor the output powers delivered to the output ports 106-107. The system monitor's couplings to the output of the power source and the outputs of the power converters 103-104 are shown in solid lines in FIG. 1 for illustrative purposes, notwithstanding that the monitoring of such outputs is merely preferable, not required. Still further, the system monitor 101 may be alternatively or additionally coupled to the temperature sensing circuits 109-112, as well as to one or more temperature sensing circuits (not shown) positioned proximate the power source, to enable the system monitor 101 to monitor outputs (e.g., voltages) representative of temperatures sensed by the temperature sensing circuits 109-112. The system monitor 101 may be further coupled to control inputs of the power converters 103-104, either directly or through respective combiners 114-115, to enable the system monitor 101 to control the power conversions performed by the power converters 103-104 and thereby control the amount of power delivered to each output port 106-107.

Each power converter 103-104 is coupled to the output of the power source and may be a DC-to-DC converter (where the power source supplies DC output power (current and voltage)) or an AC-to-DC converter (where the power source supplies AC output power). The power converters 103-104 may be step-down converters, such as buck converters, when the voltage supplied by the power source is greater than the maximum voltage which may be required by the output ports 106-107. Alternatively, the power converters 103-104 may be step-up converters, such as boost converters, when the voltage supplied by the power source is less than the maximum voltage which may be required by the output ports 106-107.

Figure 4:
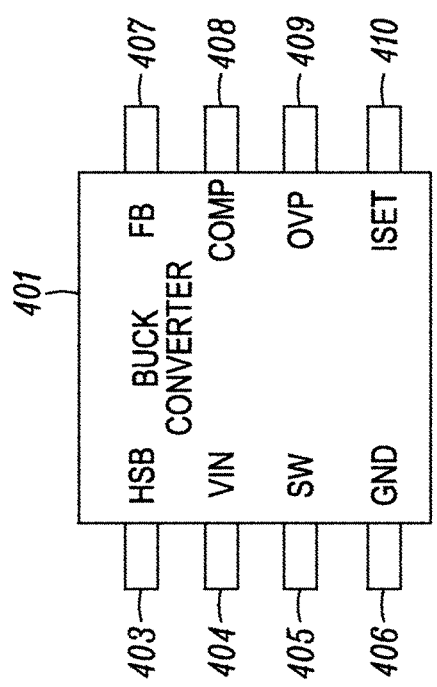
FIG. 4 illustrates a pin layout for an exemplary solid-state buck converter which may be used in various embodiments of the present disclosure.

Each power converter 103-104 may be a solid-state device, such as the exemplary solid-state buck converter 401 illustrated in FIG. 4, with appropriate circuitry connected to the pins 403-410 of the converter 401 to bias the converter's internal transistors and allow the system controller 101 to control the converter's operation, such as its output power. The buck converter 401 illustrated in FIG. 4 corresponds to an ACT 4533 buck converter, which is commercially available from Active-Semi, Inc. of Dallas, Tex. The pin out for an ACT 4533 buck converter 401 is shown in FIG. 4, where "HSB" refers to high side bias to internal metal oxide field-effect transistor (MOSFET), "VIN" refers to the input voltage, "SW" refers to power switching output to external inductor, "GND" refers to ground, "FB" refers to feedback, "COMP" refers to error amplifier output, "OVP" refers to over-voltage protection, and "ISET" refers to current set resistor.

Each output port 106-107 may be a port that complies with one or more industry interface specifications. For example, each output port 106-107 may be USB-compliant (e.g., a full-sized USB connector (USB Type A) or a microUSB connector (USB Micro B)). Where the output ports 106-107 are USB connectors, they may facilitate the exchange of data between the load devices and the power supply system 100 through the D+ and D− data pins of the connectors, in accordance with the USB specification. As an alternative to being USB-compliant, the output ports 106-107 may be connectors that support proprietary interconnect protocols used by the load devices. Each output port 106-107 delivers power from a linked power converter 103-104 to a load device coupled to the output port 106-107 via compatible cabling. The load device may be any electronic device capable of receiving external power from the power supply system 100 for use in operating the load device or charging a battery or other localized source of power used by the load device. By way of example only, the load devices may be cellular phones, smartphones, tablet computers, palmtop computers, personal digital assistants (PDAs), audio players (e.g., MP3 players), video players, multimedia devices (e.g., the iPOD TOUCH™), or any other electronic device.

When included, the temperature sensing circuits 109-112 may be conventional thermistor-based sensing circuits, which include thermistors selected to have the appropriate variation and sensitivity necessary to sense the changes in temperature of the components being monitored and to produce wide enough variations in output voltages such that the system monitor 101 can detect the changes in temperature. As illustrated in FIG. 1, the temperature sensing circuits 109-112 may be positioned proximate the power converters 103-104, proximate the output ports 106-107, and/or at such other locations of the power supply system 100 that may exhibit significant changes in temperature, especially significant heating. One or more temperature sensing circuits may also be positioned proximate the power source and have their outputs routed to the system monitor 101 to enable the system monitor 101 to take appropriate action, such as reducing the output power of one or more of the power converters 103-104, in the event that the outputs of the temperature sensing circuit or circuits indicate an overload condition.

Where the output ports 106-107 are USB-compliant, the power supply system 100 may include USB FSK modulation decoders 123-124 and/or HVDCP protocol decoders 120-121 to enable the power supply system 100 to receive, in accordance with conventional techniques, output power and/or voltage requests from the load devices (not shown) coupled to the output ports 106-107. Where one or both types of decoders are included in the power supply system 100, the system 100 may further include output monitors/comparators 117-118. Each monitor/comparator 117, 118 monitors the output power or voltage of an associated power converter 103, 104 and compares the output power/voltage to an output power/voltage (Voltage Select) requested by a corresponding load device. To request a desired output power/voltage, a load device may use, for example, the HVDCP protocol over the USB data lines or FSK modulation over the $V_{bus}$ signal of the particular output port 106, 107. Alternatively, the load device may use other schemes for requesting a desired output power/voltage, such as a full USB host implementation where the output ports 106-107 are USB-compliant, a proprietary protocol where the output ports 106-107 utilize a load device-specific proprietary serial bus, or any other schemes as may be known in the art. When a load device's requested voltage is different than the voltage presently being supplied by the applicable power converter 103, 104 to the output port 106, 107 to which the load device is connected, the associated output monitor/comparator 117, 118 provides an output signal to the corresponding combiner 114, 115 indicating the desired change in voltage. On the other hand, when a load device's requested voltage matches the voltage presently being supplied by the applicable power converter 103, 104 to the output port 106, 107 to which the load device is connected, the associated output monitor/comparator 117, 118 may provide either no output signal or an output signal indicating no change in voltage is required.

The combiners 114-115 may be junctions, diode OR configurations, operational amplifiers, or discrete transistor circuits that actively or passively select between output signals from the system monitor 101 and outputs of the output monitors/comparators 117-118 to supply as control signals to the power converters 103-104 for purposes of maintaining or adjusting the power converters' output powers. According to one embodiment in which the combiners 114-115 are diode OR configurations, the combiners 114-115 are arranged to allow the output signals from the system monitor 101 to be used as the control signals for the power converters 103-104 when such output signals have been produced by the system monitor 101. Otherwise, the outputs of the output monitors/comparators 117-118 provide the control signals to the power converters 103-104. In this configuration, the system monitor 101 may provide output signals only upon determining that an overload condition is being approached.

Figure 2:
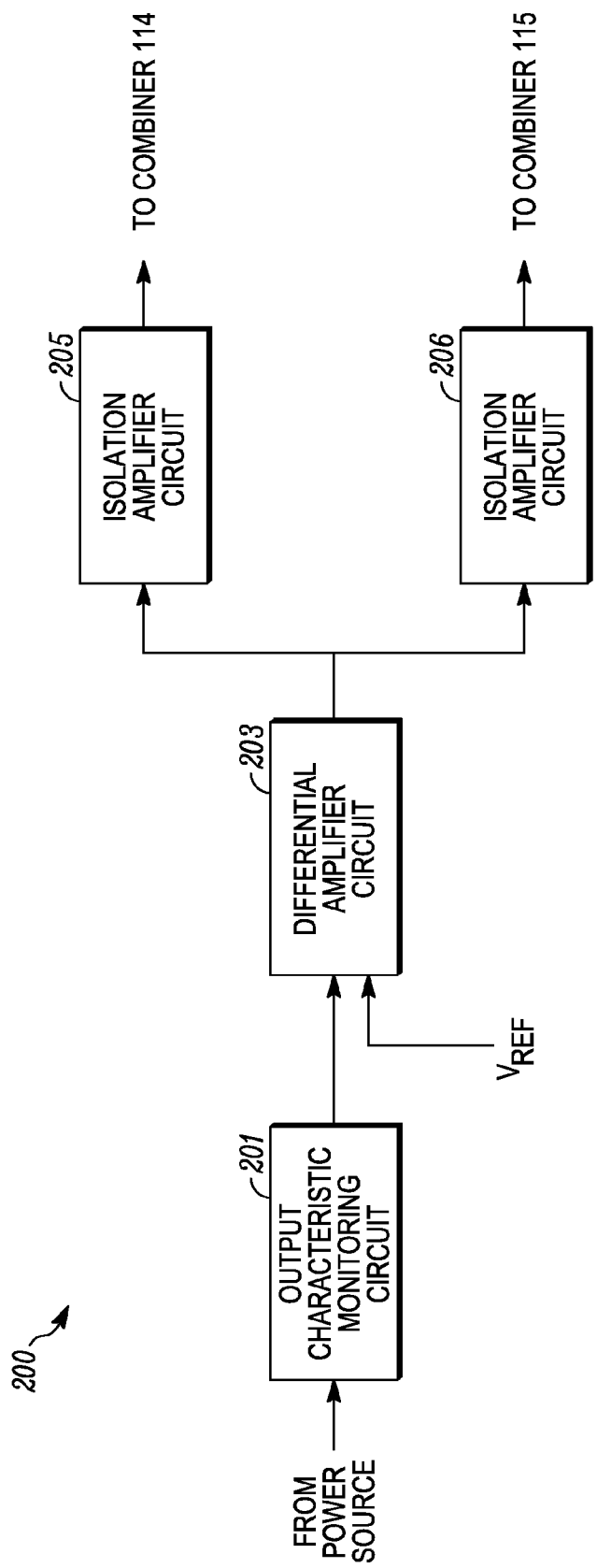
FIG. 2 illustrates an electrical block diagram of a system monitor or a portion thereof, in accordance with one exemplary embodiment of the present disclosure.
Figure 3:
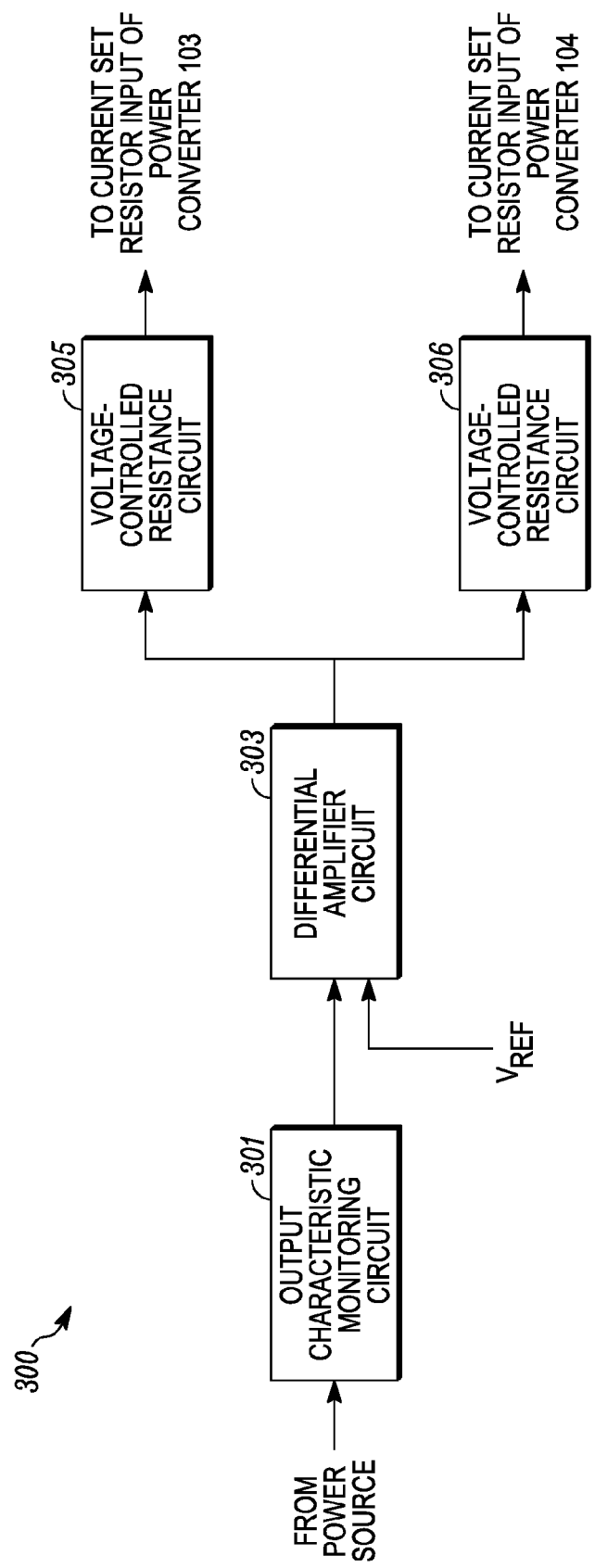
FIG. 3 illustrates an electrical block diagram of a system monitor or a portion thereof, in accordance with another exemplary embodiment of the present disclosure.

FIGS. 2 and 3 illustrate electrical block diagrams of analog circuit topologies that may be used as complete or partial implementations for the system monitor 101 to perform upstream monitoring and supply control signals to the power converters 103-104. According to the embodiment of FIG. 2, an upstream monitoring portion 200 of the system controller 101 may include an output characteristic monitoring circuit 201, a differential amplifier circuit 203, and a plurality of isolation amplifier circuits 205-206 (two shown for illustrative purposes and to coincide with the quantity of power converters 103-104 illustrated in FIG. 1). According to the embodiment of FIG. 3, an alternative upstream monitoring portion 300 of the system controller 101 may include an output characteristic monitoring circuit 301, a differential amplifier circuit 303, and a plurality of voltage-controlled resistance circuits 305-306 (two shown for illustrative purposes and to coincide with the quantity of power converters 103-104 illustrated in FIG. 1). The exemplary embodiments illustrated in FIGS. 2 and 3 are particularly, though not solely, useful where the power converters 103-104 are implemented as solid-state buck converters, such as the buck converter 401 illustrated in FIG. 4.

Referring first to the upstream monitoring implementation of FIG. 2, the output characteristic monitoring circuit 201 is coupled to the output of the power source and monitors one or more output characteristics of the power source. The output characteristic monitoring circuit 201 produces an output voltage based on the monitored characteristic or characteristics. For example, the output characteristic monitoring circuit 201 may monitor the output voltage, the output current, and/or the output power of the power source and generate a corresponding output voltage representing the presently detected magnitude of the monitored characteristic. The output characteristic monitoring circuit 201 may be implemented as a voltage divider, a current sensing resistor, or in any other manner which enables monitoring of an output characteristic of the power source.

The output voltage produced by the output characteristic monitoring circuit 201 is supplied to one of the inputs of the differential amplifier circuit 203, which produces an output voltage corresponding to a difference between the output voltage from the output characteristic monitoring circuit 201 and a reference voltage. According to one embodiment, the differential amplifier circuit 203 may be conventionally implemented using an operational amplifier and appropriate input and feedback resistors. The reference voltage may be selected such that when the reference voltage is greater than the output voltage of the output characteristic monitoring circuit 201 by a threshold amount, the differential amplifier circuit 203 produces an output voltage at a level which, when supplied to the power converter 103, 104, causes the power converter 103, 104 to reduce its output power. For example, where each power converter 103, 104 is implemented using a solid-state buck converter 401 in the form illustrated in FIG. 4, the reference voltage for each differential amplifier circuit 203 may be selected to produce a differential amplifier circuit output voltage of about 0.8 Volts, or such other voltage as may be necessary to control the buck converter 401, when power reduction by the power converter 103, 104 is necessary. Thus, the output voltage of the differential amplifier circuit 203 is indicative of whether an overload condition is being approached based on the output characteristic of the power source.

According to the exemplary embodiment shown in FIG. 2, the output voltage of the differential amplifier circuit 203 is applied to the inputs of the isolation amplifier circuits 205-206. Each isolation amplifier circuit 205, 206 may be implemented using an operational amplifier configured for unity gain with diode output protection. Thus, the output voltage produced by each isolation amplifier circuit 205, 206 is identical to the output voltage of the differential amplifier circuit 203. The output of each isolation amplifier circuit 205, 206 is coupled to a control input of an associated power converter 103, 104 either directly or through a combiner 114, 115. The combiner 114, 115 may only be necessary when the control input of the power converter 103, 104 is also controllable by an output monitor/comparator 117, 118 in response to an output voltage requested by the load device. Where the combiner 114, 115 is used, the isolation amplifier circuit 205, 206 isolates the combiner 114, 115 from the output of the differential amplifier circuit 203 so that the output of the output monitor/comparator 117, 118 does not affect the operation of the differential amplifier circuit 203. When each power converter 103, 104 is implemented using the solid-state buck converter 401 of FIG. 4, the output of each isolation amplifier circuit 205, 206 may be coupled directly or indirectly (e.g. through the combiner 114, 115) to the feedback input (feedback pin 407) of an associated power converter 103, 104.

Depending on the design of the power converter 103, 104, the application of the differential amplifier output voltage to the control input of the power converter 103, 104 may cause the power converter 103, 104 to reduce its output voltage in a prescribed manner, such as by a stepped reduction, or to a pre-established minimum, non-zero value. The pre-established minimum value may be set to provide the minimum amount of power necessary to enable the load device to operate at a level that is acceptable to its user. For example, the pre-established minimum value for the output voltage of the power converter 103, 104 may be a voltage that allows the load device to remain operational, albeit at a lower performance level, without having to reboot. Alternatively, the pre-established minimum value for the output voltage of the power converter 103, 104 may be set to enable the load device to perform at least a predetermined set of functions. Those of ordinary skill in the art will readily recognize and appreciate that the power converter 103, 104 can be configured to provide an appropriate level of output voltage as may be necessary on a case-by-case basis in response to receipt of the output voltage of the differential amplifier circuit 203.

Referring now to the upstream monitoring implementation of FIG. 3, the output characteristic monitoring circuit 301 and the differential amplifier circuit 303 of this implementation may be configured in a manner similar to the output characteristic monitoring circuit 201 and the differential amplifier circuit 203 of FIG. 2, except that the gain applied by the differential amplifier circuit 303 and the resulting output voltage produced by the differential amplifier circuit 303 may be different than the gain and output voltage of the differential amplifier circuit 203 of FIG. 2. The reference voltage applied to one input of the differential amplifier circuit 303 may be selected such that when the reference voltage is greater than the output voltage of the output characteristic monitoring circuit 301 by a threshold amount, the differential amplifier circuit 303 produces an output voltage at a level which, when supplied to the voltage-controlled resistance circuits 305-306, causes each voltage-controlled resistance circuit 305, 306 to change the current set resistance to be applied to the power control input (e.g., the ISET input of the buck converter 401 of FIG. 4) of an associated power converter 103, 104, which in turn causes the power converter 103, 104 to reduce its output power. In other words, the upstream monitoring portion 300 may be implemented such that when the output voltage of the differential amplifier 303 is indicative of an approaching overload condition, each voltage-controlled resistance circuit 305, 306 changes the resistance applied to the power control input of its associated power converter 103, 104, thereby causing the power converter 103, 104 to reduce its output power. The change in resistance may be accomplished by selecting between a first resistor or set of resistors and a second resistor or set of resistors for connection between the power control input and ground, where the first resistor or set of resistors is selected when the output voltage of the differential amplifier 303 is not indicative of an approaching overload condition and the second resistor or set of resistors is selected when the output voltage of the differential amplifier 303 is indicative of an approaching overload condition.

For example, where each power converter 103, 104 is implemented using a solid-state buck converter 401 in the form illustrated in FIG. 4 and where each voltage-controlled resistance circuit 305, 306 is implemented using a voltage-controlled switch (e.g., an N-channel MOSFET switch) operable to change the resistance connected between the power control input (ISET pin 410) of the buck converter 401 and ground, the reference voltage for each differential amplifier circuit 303 may be selected to produce a differential amplifier circuit output voltage sufficient to activate the voltage-controlled resistance circuit 305, 306, when power reduction by the power converter 103, 104 is necessary. The values of the resistance applied to the power control input of the buck converter 401 may be selected based on desired values for the output power of the power converter 103, 104 during normal operation and reduced-power operation. In this embodiment, the current flowing through the selected resistance provides the control signal to the power converter 103, 104. Thus, the changes in resistance applied to the power control input of the power converter 103, 104 by the upstream monitoring portion 300 serves to provide different control signals to the power converter 103, 104.

The upstream monitoring portion 200, 300 of the system monitor 101 configured as illustrated in FIG. 2 or FIG. 3 controls the power converters 103-104 in an identical manner and thereby causes the power converters 103-104 to proportionately reduce their output powers. In an alternative embodiment, especially one in which the system monitor 101 is processor-controlled, different control inputs may be provided to each power converter 103, 104, or to at least two of the power converters 103-104, so as to produce a disproportionate reduction in output powers by the power converters 103-104. For example according to one embodiment, one or more power converters may remain operating normally, while the output powers of other power converters are reduced either proportionately or disproportionately. Alternatively, the power converters 103-104 that remain operational notwithstanding an approaching overload condition may be controlled to have different or disproportionate reductions in output powers. For example, with respect to the upstream monitoring portion embodiment of FIG. 3, different sets of resistors may be used for the power converters 103-104 such that when the voltage-controlled resistance circuits 305-306 change current set resistances in response to the output voltage of the differential amplifier 303, the changes in output powers of the affected power converters 103-104 are disproportionate to one another. Therefore, unlike prior approaches which deactivate all but one output port upon detecting an overload condition, the embodiments disclosed herein supply output powers to two or more output ports 106-107 so as to enable load devices coupled thereto to continue operating without jeopardizing the device users' experience.

FIG. 5 illustrates a logic flow diagram 500 of steps performed by a power supply system 100 to contemporaneously supply output power to multiple output ports 106-107 when available power from a power source is insufficient to meet the maximum potential power requirements of load devices coupled to the output ports, in accordance with a further exemplary embodiment of the present disclosure. The logic flow steps may be executed, as applicable, by various components of the power supply system 100, including, but not limited to, the system monitor 101 (and its constituent hardware components and/or software modules), the power converters 103-104, the output ports 106-107, and the temperature sensing circuits 109-112. The steps executed by the system monitor 101 may be performed by a processor 126 in accordance with the operating instructions stored in a memory accessible by the processor 126 (e.g., a memory embedded within the system controller 101) or by analog and/or digital circuitry, such as the circuit blocks illustrated in FIGS. 2 and 3. For purposes of the following illustrative description of power supply system operation, reference will be primarily made to the power supply system 100 illustrated in FIG. 1.

According to the exemplary logic flow, the power supply system 100 may electronically monitor (501) one or more output power characteristics of the power source. The monitored output power characteristics may include any one or more of voltage, current, and power. The power supply system 100 may include a system monitor 101 that is coupled to the output of the power source and configured to monitor one or more characteristics of the power source's output. For example, the system monitor 101 may include a voltage sensor, a current sensing resistor, and/or a power meter configured to monitor the output of the power source.

Alternatively or additionally, the power supply system 100 may electronically monitor (503) output powers delivered to the system's output ports 106-107. For example, the system monitor 101 may include voltage sensors, current sensing resistors, and/or power meters coupled to the outputs of the power converters 103-104 to monitor the characteristics of the output powers supplied by the power converters 103-104 to their respective output ports 106-107. The system monitor 101 may also include a processor 126 to determine the amount of power supplied by each power converter 103, 104 based on the monitored characteristics.

Besides, or instead of, monitoring the output power characteristics of the power source and determining the output powers delivered by the power converters 103-104, the power supply system 100 may electronically sense (505) one or more temperatures generated within the system 100. For example, the power supply system 100 may include one or more temperature sensing circuits 109-112 positioned strategically within the system 100, such as proximate the power converters 103-104, proximate the output ports 106-107, or at any other location at which significant temperatures may arise under approaching overload conditions. Additionally or alternatively, the power supply system 100 may be configured to determine one or more temperatures associated with the power source. For example, the system monitor 101 may receive outputs from temperature sensing circuits positioned proximate one or more components of the power source.

Based on any one or more of (a) the monitored output characteristics of the power source (upstream monitoring), (b) the monitored powers delivered to the output ports 106-107 (downstream monitoring), and (c) the temperatures sensed by the system 100, the power supply system 100 determines (507) whether an overload condition is being approached. Thus, each parameter (upstream monitoring, downstream monitoring, or temperature sensing) may be considered alone to determine whether an overload condition is being approached, or combinations of the parameters may be considered. Thus, the determination of whether an overload condition is being approached may vary depending on which parameter or parameters are being evaluated.

For example, with respect to upstream monitoring, the power supply system 100 may compare a value of the monitored output power characteristic to a threshold and determine whether an overload condition is being approached based on the value of the monitored output power characteristic relative to the threshold. In such a case, when the monitored output power characteristic is at a level that is undesirable relative to the threshold, the power supply system 100 determines that an overload condition is being approached. For example, where the monitored output power characteristic is voltage or power, the power supply system 100 may determine that an overload condition is being approached when the value of the power source's output voltage or power is less than a respective threshold. Alternatively, where the monitored output power characteristic is current, the power supply system 100 may determine that an overload condition is being approached when the value of the power source's output voltage or power is greater than a respective threshold. The evaluation of the power source's output power characteristic may be made by the system monitor 101 through the use of software executed by a processor 126 and/or analog circuitry. For example, where analog circuitry is used, the upstream monitoring solution may be implemented using either the solution discussed above with respect to FIG. 2 or the solution discussed above with respect to FIG. 3. In such a case, the threshold for the particular characteristic being monitored may be used to establish the reference voltage ($V_{REF}$) applied to the respective differential amplifier circuit 203, 303.

Alternatively, instead of comparing a value of a monitored output power characteristic of the power source to a respective threshold in order to evaluate whether an overload condition is being approached, the power supply system 100 may use values of an output power characteristic monitored over time to compute a slope of the output power characteristic. In such a case, a determination as to whether an overload condition is being approached may be made based on the slope of the output power characteristic. For example, where the monitored output power characteristic of the power source is output voltage, an overload condition may be determined to be approaching when the slope of the power source's output voltage is decreasing, or decreasing at a rate greater than a threshold rate. On the other hand, where the monitored output power characteristic of the power source is output current, an overload condition may be determined to be approaching when the slope of the power source's output current is increasing, or increasing at a rate greater than another threshold rate.

With respect to downstream monitoring, the power supply system 100 may determine whether an overload condition is being approached by summing values representing the power converter output powers delivered to the output ports 106-107 (i.e., determining the aggregate power presently being delivered to attached load devices), comparing the sum to a threshold, and determining an overload condition is being approached when the sum exceeds the threshold. The threshold in this case may be equal to a value representing substantially all of the power available from the power source (e.g., a value representing 95-100% of the power available from the power source) or a value representing a predetermined portion of the power available from the power source (e.g., a value representing 90-95% of the available power).

With respect to temperature sensing, the power supply system 100 may determine whether an overload condition is being approached by comparing each detected temperature to an associated threshold and determining that an overload condition is being approached when any of the detected temperatures exceeds its associated threshold. The thresholds may be empirically determined and stored in memory accessible by the system monitor 101 or its processor 126. Alternatively, for a hardware implementation, the thresholds may be used to establish reference voltages for differential amplifiers or comparators that produce output voltages indicative of whether an overload condition is being approached in response to input voltages from the temperature sensing circuits 109-112.

Therefore, as detailed above, the determination of whether an overload condition is being approached may be made based upon upstream monitoring, downstream monitoring, temperature sensing, or on any combination thereof. Where a combination of overload detection mechanisms is used, an approaching overload condition may be detected from any one of the detection mechanisms of the combination or from multiple detection mechanisms of the combination, depending on the configuration of the power supply system 100. For example, where upstream monitoring and temperature sensing are used, the power supply system 100 may be configured to require that an output power characteristic of the power source be undesirable relative to its associated threshold and a detected temperature be greater than its associated threshold in order to indicate that an overload condition is being approached. Alternatively, where downstream monitoring and temperature sensing are used, the power supply system 100 may be configured to require that the sum of monitored output powers delivered to the output ports 106-107 be greater than its associated threshold and a detected temperature be greater than its associated threshold in order to indicate that an overload condition is being approached. Further, where upstream monitoring and downstream monitoring are used, the power supply system 100 may be configured to require that an output power characteristic of the power source be undesirable relative to its associated threshold and the sum of monitored output powers delivered to the output ports 106-107 be greater than its associated threshold in order to indicate that an overload condition is being approached. Still further, where all three overload detection mechanisms are used, the power supply system 100 may be configured to require that an output power characteristic of the power source be undesirable relative to its associated threshold, the sum of monitored output powers delivered to the output ports 106-107 be greater than its associated threshold, and a detected temperature be greater than its associated threshold in order to indicate that an overload condition is being approached.

If the power supply system 100 determines (507) that an overload condition is being approached, the system 100 electronically reduces (509) the aggregate power supplied to the output ports 106-107, such that at least two of the output ports 106-107 continue to deliver output power to attached load devices (where at least two load devices are coupled to the output ports 106-107 at the time at which the power supply system 100 determines that an overload condition is being approached). The power may be reduced by controlling one or more of the power converters 103-104 to reduce the output voltages and/or currents supplied to the output ports 106-107. According to one embodiment, the power supply system 100 may proportionately reduce the power supplied to each active output port 106-107 (i.e., an output port to which a load device is coupled) in order to abate the overload condition. The reduction in output power may occur over time in a stepped manner, with a new determination of whether an overload condition is still approaching being performed after each reduction step. The time between power reductions in the stepped approach may be sufficient to allow the power supply system 100 to reach steady-state operation with respect to the most recent stepped reduction in output power. The time between power reduction steps may be longer where temperature sensing is involved due to the reaction and/or settling times of the thermistors or other temperature-sensing devices.

According to an alternative embodiment, the power supply system 100 may reduce the power to each active output port 106-107 in a disproportionate manner. For example, the power supply system 100 may detect the types of load devices connected to each active output port 106-107 and apportion the reduced aggregate output power such that each load device continues to receive an amount of power enabling it to generally operate, albeit at a reduced functional level. In such a case, the power supply system 100 may apportion more power to the active output ports 106-107 supporting load devices with generally higher power requirements, such as tablet computers, and less power to the active output ports 106-107 supporting load devices with generally lower power requirements, such as cell phones. Alternatively, certain output ports 106-107 may be assigned a priority status (either a priori or based on the types of attached load devices) and the power supply system 100 may apportion more power to the higher priority active output ports 106-107 than to the lower priority active output ports 106-107. Those of ordinary skill in the art will readily recognize and appreciate that a variety of other conditions and algorithms may be used to apportion output power to the active output ports 106-107 when a power reduction is deemed necessary in order to abate an approaching overload condition. All such conditions and algorithms are considered to be within the scope of the present disclosure so long as such conditions and algorithms result in power being supplied to two or more active output ports 106-107 of the power supply system 100.

According to another alternative embodiment, the power supply system 100 may reduce power to only one active output port 106, where such a reduction will abate the overload condition and allow the load device coupled to the output port 106 to still receive at least a minimum required level of power. The selection of which active output port 106 will have its power reduced under an approaching overload condition may be made by the power supply system 100 (e.g., the system monitor 101 or its processor 126) based on a preprogrammed default selection or on a selection algorithm. For example, the power supply system 100 may elect to reduce power to the active output port 106 that is drawing the least amount of current at the time an output power reduction becomes necessary, or to an active output port 106 having a lowest priority status. Those of ordinary skill in the art will readily recognize and appreciate that a variety of other conditions and algorithms may be used to select which active output port 106 will have its output power reduced when a power reduction is deemed necessary in order to abate an approaching overload condition. All such conditions and algorithms are considered to be within the scope of the present disclosure so long as such conditions and algorithms result in a sufficient level of power being delivered to the reduced power active output port 106 to allow an attached load device to provide at least minimal functionality to its user (e.g., does not result in rebooting or restarting of the load device).

The present disclosure relates to a power supply system and associated methods of operation for providing power management at output ports of the power supply system, especially when an overload or over power condition is being approached. The disclosed power supply system and methods are operable to abate the overload condition, while still supplying output power to load devices coupled to multiple output ports of the power supply system. More particularly, the disclosed methods enable the power supply system to monitor for an approaching overload condition and proactively take overload abatement measures, while continuing to supply enough power to attached load devices so as not to impact the performance of the load devices in an unacceptable manner. Instead of deactivating all but a high power or high priority output port when an overload condition is reached, the power supply system and processes disclosed herein allow power to be contemporaneously supplied to multiple output ports while avoiding or abating the overload condition.

As detailed above, embodiments of the disclosed power supply system and operational methods reside primarily in combinations of process steps and/or apparatus components related to enabling power to be contemporaneously supplied to multiple output ports when available power from a power source is insufficient to meet the maximum potential power requirements of load devices coupled to the output ports. Accordingly, the apparatus components and process steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Additionally, while FIG. 5 illustrates one exemplary arrangement for implementing process steps of the disclosed method, those skilled in the art will recognize and appreciate that the order of steps which are not dependent upon other steps may be changed as desired without departing from the spirit and scope of the present invention as set forth in the appended claims.

In this document, relational terms such as "first" and "second," "top" and "bottom," and the like may be used solely to distinguish one element or action from another element or action without necessarily requiring or implying any actual relationship or order between such elements or actions. The terms "comprises," "comprising," "includes," "including," "has," "having," "contains," "containing," and any other variations thereof are intended to cover a non-exclusive inclusion, such that a process, method, device, article, or apparatus that comprises, includes, has, or contains a list of elements does not include only those elements but may include other elements not expressly listed or inherent to such process, method, device, article, or apparatus. The terms "plurality of" or "multiple" as used in connection with any element or action means two or more of such element or action. A claim element proceeded by the article "a" or "an" does not, without more constraints, preclude the existence of additional identical elements in the process, method, device, article, or apparatus that includes the element.

It will be appreciated that embodiments of the power supply system 100 and its system monitor 101 as described herein may be comprised of one or more conventional processors or controllers and unique stored program instructions that control the processor(s) or controller(s) to implement, in conjunction with certain non-processor circuits, some, most, or all of the functions of the power supply system 100 and its operational methods as described herein. The non-processor circuits may include, but are not limited to, the power converters 103-104, the temperature sensing circuits 109-112, the combiners 114-115, the upstream monitoring implementations 200, 300 illustrated in FIGS. 2 and 3, as well as filters, clock circuits, and various other non-processor circuits. As such, the functions of the processor and non-processor circuits may be collectively interpreted as steps of a method for contemporaneously supplying power to multiple output ports when available power from a power source is insufficient to meet the maximum potential power requirements of load devices coupled to the output ports. Alternatively, some or all functions of the system monitor 101 or its processor 126 could be implemented by a state machine that has no stored program instructions, or in one or more application specific integrated circuits (ASICs), in which each function or some combinations of functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating software instructions or programs and/or integrated circuits to implement the process disclosed herein without undue experimentation.

In the foregoing specification, specific embodiments of a power supply system and its operational methods have been described. However, one of ordinary skill in the art will appreciate that various modifications and changes can be made without departing from the scope of the present invention as set forth in the appended claims. Accordingly, the specification and figures are to be regarded in an illustrative rather than a restrictive sense, and all such modifications are intended to be included within the scope of the disclosed apparatus and methods. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims and all equivalents of those claims as issued.

What is claimed is:

1. A method for contemporaneously supplying power to a plurality of output ports when available power from a power source is insufficient to meet maximum potential power requirements of load devices coupled to the plurality of output ports, the method comprising:

electronically monitoring at least one of (a) one or more output power characteristics of the power source and (b) output powers delivered to the plurality of output ports;

electronically determining whether an overload condition is being approached based on results of the electronic monitoring; and when an overload condition is being approached, electronically reducing an amount of power supplied to the plurality of output ports, such that the overload condition is abated and two or more output ports of the plurality of output ports continue to deliver output power to respective load devices.

2. The method of claim 1, wherein electronically determining whether an overload condition is being approached comprises:

summing values representing monitored output powers delivered to the plurality of output ports to produce a summation;

comparing the summation to a threshold; and electronically determining that an overload condition is being approached when the summation exceeds the threshold.

3. The method of claim 2, wherein the threshold is equal to a value representing a predetermined portion of the available power.

4. The method of claim 2, wherein the threshold is equal to a value representing substantially all of the available power.

5. The method of claim 1, wherein electronically determining whether an overload condition is being approached comprises:

electronically determining whether an overload condition is being approached based on the one or more output power characteristics of the power source and the output powers delivered to the plurality of output ports.

6. The method of claim 1, wherein electronically determining whether an overload condition is being approached comprises:

comparing a value of a monitored output power characteristic to a threshold; and electronically determining whether an overload condition is being approached based on the value of the monitored output power characteristic relative to the threshold.

7. The method of claim 1, wherein electronically determining whether an overload condition is being approached comprises:

electronically determining whether an overload condition is being approached based on a slope of a monitored output power characteristic.

8. The method of claim 7, wherein electronically determining whether an overload condition is being approached based on a slope of a monitored output power characteristic comprises:

electronically determining that an overload condition is being approached when the monitored output power characteristic is output voltage and the slope of the output voltage is decreasing.

9. The method of claim 1, wherein electronically reducing an amount of power supplied to the plurality of output ports comprises:

electronically reducing at least one of voltages and currents supplied to the plurality of output ports.

10. The method of claim 1, wherein electronically reducing an amount of power supplied to the plurality of output ports comprises:

proportionately reducing amounts of power supplied to each of the two or more output ports.

11. The method of claim 1, wherein electronically reducing an amount of power supplied to the plurality of output ports comprises:

disproportionately reducing amounts of power supplied to each of the two or more output ports such that an amount of power supplied to each output port is greater than zero.

12. The method of claim 1, wherein electronically reducing an amount of power supplied to the plurality of output ports comprises:

electronically reducing an amount of power supplied to one output port of the two or more output ports, such that the amount of output power supplied to the one output port remains greater than zero.

13. The method of claim 1, further comprising:

electronically sensing at least one temperature of a power supply system that is supplying the power to the plurality of output ports to produce at least one detected temperature;

wherein the determination of whether an overload condition is being approached is based on at least one of (a) one or more monitored output power characteristics of the power source, (b) monitored output powers delivered to the plurality of output ports, and (c) the at least one detected temperature.

14. The method of claim 13, wherein electronically determining whether an overload condition is being approached comprises:

comparing each detected temperature to an associated temperature threshold; and electronically determining that an overload condition is being approached when a detected temperature exceeds an associated temperature threshold.

15. The method of claim 13, wherein electronically determining whether an overload condition is being approached comprises:

summing values representing monitored output powers delivered to the plurality of output ports to produce a summation;

comparing the summation to a power threshold;

comparing each detected temperature to an associated temperature threshold;

electronically determining that an overload condition is being approached when the summation exceeds the power threshold, a detected temperature exceeds an associated temperature threshold, or both.

16. The method of claim 13, wherein electronically determining whether an overload condition is being approached comprises:

comparing a value of each monitored output power characteristic to an associated power characteristic threshold;

comparing each detected temperature to an associated temperature threshold;

electronically determining that an overload condition is being approached when a value of a monitored output power characteristic is unacceptable relative to an associated power characteristic threshold, a detected temperature exceeds an associated temperature threshold, or both.

17. A power supply system operable to contemporaneously supply power to a plurality of output ports when available power from a power source is insufficient to meet maximum potential power requirements of load devices coupled to the plurality of output ports, the power supply system comprising:
- a system monitor operable to:
  - monitor at least one of (a) one or more output power characteristics of the power source and (b) output powers delivered to the plurality of output ports;
  - determine whether an overload condition is being approached based on results of the monitoring; and
  - generate control signals in response to determining that an overload condition is being approached;
- a first power converter operably coupled to the system monitor and a first output port of the plurality of output ports, the first power converter operable to:
  - convert power supplied by the power source into a first output power at a first output voltage during normal operation of the power supply system;
  - convert power supplied by the power source into a second output power at either the first output voltage or a second output voltage in response to a first control signal from the system monitor, wherein the second output power is non-zero and less than or equal to the first output power and wherein the second output voltage is less than the first output voltage;
  - supply one of the first output power and the second output power to the first output port; and
- a second power converter operably coupled to the system monitor and a second output port of the plurality of output ports, the second power converter operable to:
  - convert power supplied by the power source into a third output power at a third output voltage during normal operation of the power supply system; convert power supplied by the power source into a fourth output power at either the third output voltage or a fourth output voltage in response to a second control signal from the system monitor, wherein the fourth output power is non-zero and less than the third output power and wherein the fourth output voltage is less than the third output voltage; and
  - supply one of the third output power and the fourth output power to the second output port.

18. The power supply system of claim 17, wherein the one or more output power characteristics of the power source include one or more of output voltage, output current, and output power.

19. The power supply system of claim 17, wherein the system controller comprises:
- an output characteristic monitoring circuit coupled to an output of the power source, the output characteristic monitoring circuit being operable to monitor at least one output characteristic of the power source and produce an output voltage responsive thereto;
- a differential amplifier circuit coupled to the output characteristic monitoring circuit and operable to produce an output voltage corresponding to a difference between the output voltage produced by the output characteristic monitoring circuit and a reference voltage;
- a first isolation amplifier circuit coupled to an output of the differential amplifier circuit and to a power control input of the first power converter, the first isolation amplifier circuit being operable to supply the output voltage of the differential amplifier circuit to the power control input of the first power converter, the power control input of the first power converter controlling an amount of output power supplied by the first power converter, wherein the output voltage of the differential amplifier circuit is indicative of whether an overload condition is being approached based on the at least one output characteristic of the power source; and
- a second isolation amplifier circuit coupled to the output of the differential amplifier circuit and to a power control input of the second power converter, the second isolation amplifier circuit being operable to supply the output voltage of the differential amplifier circuit to the power control input of the second power converter, the power control input of the second power converter controlling an amount of output power supplied by the second power converter.

20. The power supply system of claim 19, wherein the at least one output characteristic of the power source includes at least one of output voltage and output current.

21. The power supply system of claim 19, wherein the first power converter is a first solid-state buck converter, wherein the second power converter is a second solid-state buck converter, wherein the power control input of the first power converter is a feedback input of the first solid-state buck converter, and wherein the power control input of the second power converter is a feedback input of the second solid-state buck converter.

22. The power supply system of claim 14, wherein the system controller comprises:
- an output characteristic monitoring circuit coupled to an output of the power source, the output characteristic monitoring circuit being operable to monitor at least one output characteristic of the power source and produce an output voltage responsive thereto;
- a differential amplifier circuit coupled to the output characteristic monitoring circuit and operable to produce an output voltage corresponding to a difference between the output voltage produced by the output characteristic monitoring circuit and a reference voltage;
- a first voltage-controlled resistance circuit coupled to an output of the differential amplifier circuit and to a power control input of the first power converter, the first voltage-controlled resistance circuit being operable to select a resistance applied to the power control input of the first power converter based on the output voltage of the differential amplifier circuit, the power control input of the first power converter controlling an amount of output power supplied by the first power converter, wherein the output voltage of the differential amplifier circuit is indicative of whether an overload condition is being approached based on the at least one output characteristic of the power source; and
- a second voltage-controlled resistance circuit coupled to the output of the differential amplifier circuit and to a power control input of the second power converter, the second voltage-controlled resistance circuit being operable to select a resistance applied to the power control input of the second power converter based on the output voltage of the differential amplifier circuit, the power control input of the second power converter controlling an amount of output power supplied by the second power converter.

23. The power supply system of claim 22, wherein the first power converter is a first solid-state buck converter, wherein the second power converter is a second solid-state buck converter, wherein the power control input of the first power converter is a current set resistor input of the first solid-state buck converter, and wherein the power control input of the second power converter is a current set resistor input of the second solid-state buck converter.

24. The power supply system of claim 22, wherein the first voltage-controlled resistance circuit selectively connects one or more resistors between the power control input of the first power converter and ground based on the output voltage of the differential amplifier and wherein the second voltage-controlled resistance circuit selectively connects one or more resistors between the power control input of the second power converter and ground based on the output voltage of the differential amplifier.

25. The power supply system of claim 17, wherein the first power converter and the second power converter are direct current-to-direct current (DC-to-DC) converters.

26. The power supply system of claim 25, wherein the first power converter and the second power converter are step-down DC-to-DC-converters.

27. The power supply system of claim 17, wherein the power source is an alternating current-to-direct current (AC-to-DC) converter.

28. The power supply system of claim 17, wherein a reduction of the first output power to the second output power by the first power converter is proportionate to a reduction of the third output power to the fourth output power by the second power converter.

29. The power supply system of claim 17, wherein a reduction of the first output power to the second output power by the first power converter is disproportionate to a reduction of the third output power to the fourth output power by the second power converter.

30. The power supply system of claim 17, further comprising:
at least one temperature sensing circuit operably coupled to the system monitor and operable to detect at least one temperature of the power supply system to produce at least one detected temperature;
wherein the system monitor is further operable to:
determine whether an overload condition is being approached based on at least one of (a) one or more monitored output power characteristics of the power source, (b) monitored output powers delivered to the plurality of output ports, and (c) the at least one detected temperature.

31. The power supply system of claim 30, wherein the at least one temperature sensing circuit is operable to detect a temperature proximate the first power converter and a temperature proximate the second power converter.

32. The power supply system of claim 30, wherein the at least one temperature sensing circuit is operable to detect a temperature proximate the first output port and a temperature proximate the second output port.

33. The power supply system of claim 31, wherein the at least one temperature sensing circuit is operable to detect a temperature proximate the power source.

34. A power supply system operable to contemporaneously supply power to a plurality of output ports when available power from a power source is insufficient to meet maximum potential power requirements of load devices coupled to the plurality of output ports, the power supply system comprising:
at least one temperature sensing circuit operable to detect at least one temperature of the power supply system to produce at least one detected temperature;
a processor-based system monitor operably coupled to the at least one temperature sensing circuit and operable to:
determine whether an overload condition is being approached based on the at least one detected temperature; and
generate control signals in response to determining that an overload condition is being approached;
a first power converter operably coupled to the system monitor and a first output port of the plurality of output ports, the first power converter operable to:
convert power supplied by the power source into a first output power at a first output voltage during normal operation of the power supply system;
convert power supplied by the power source into a second output power at either the first output voltage or a second output voltage in response to a control signal from the system monitor, wherein the second output power is non-zero and less than or equal to the first output power and wherein the second output voltage is less than the first output voltage;
supply one of the first output power and the second output power to the first output port; and
a second power converter operably coupled to the system monitor and a second output port of the plurality of output ports, the second power converter operable to:
convert power supplied by the power source into a third output power at a third output voltage during normal operation of the power supply system;
convert power supplied by the power source into a fourth output power at either the third output voltage or a fourth output voltage in response to a control signal from the system monitor, wherein the fourth output power is non-zero and less than the third output power and wherein the fourth output voltage is less than the third output voltage; and
supply one of the third output power and the fourth output power to the second output port.

35. The power supply system of claim 34, wherein the system controller is operable to determine whether an overload condition is being approached based on the at least one detected temperature by:
comparing each detected temperature to an associated temperature threshold; and
determining that an overload condition is being approached when a detected temperature exceeds an associated temperature threshold.

36. A power supply system operable to contemporaneously supply power to a plurality of output ports when available power from a power source is insufficient to meet maximum potential power requirements of load devices coupled to the plurality of output ports, the power supply system comprising:
a first power converter operably coupled to a first output port of the plurality of output ports, the first power converter operable to:
convert power supplied by the power source into a first output power at a first output voltage during normal operation of the power supply system;
convert power supplied by the power source into a second output power at either the first output voltage or a second output voltage in response to a first control signal, wherein the second output power is non-zero and less than or equal to the first output power and wherein the second output voltage is less than the first output voltage;
supply one of the first output power and the second output power to the first output port; and
a second power converter operably coupled to a second output port of the plurality of output ports, the second power converter operable to:

convert power supplied by the power source into a third output power at a third output voltage during normal operation of the power supply system;

convert power supplied by the power source into a fourth output power at either the third output voltage or a fourth output voltage in response to a second control signal, wherein the fourth output power is non-zero and less than the third output power and wherein the fourth output voltage is less than the third output voltage; and supply one of the third output power and the fourth output power to the second output port;

an output characteristic monitoring circuit coupled to an output of the power source, the output characteristic monitoring circuit being operable to monitor at least one output characteristic of the power source and produce an output voltage responsive thereto;

a differential amplifier circuit coupled to the output characteristic monitoring circuit and operable to produce an output voltage corresponding to a difference between the output voltage produced by the output characteristic monitoring circuit and a reference voltage;

a first isolation amplifier circuit coupled to an output of the differential amplifier circuit and to a power control input of the first power converter, the first isolation amplifier circuit being operable to supply the output voltage of the differential amplifier circuit to the power control input of the first power converter as the first control signal, the power control input of the first power converter controlling an amount of output power supplied by the first power converter, wherein the output voltage of the differential amplifier circuit is indicative of whether an overload condition is being approached based on the at least one output characteristic of the power source; and a second isolation amplifier circuit coupled to the output of the differential amplifier circuit and a power control input of the second power converter, the second isolation amplifier circuit being operable to supply the output voltage of the differential amplifier circuit to the power control input of the second power converter as the second control signal, the power control input of the second power converter controlling an amount of output power supplied by the second power converter.

37. A power supply system operable to contemporaneously supply power to a plurality of output ports when available power from a power source is insufficient to meet maximum potential power requirements of load devices coupled to the plurality of output ports, the power supply system comprising:

a first power converter operably coupled to a first output port of the plurality of output ports, the first power converter operable to:

convert power supplied by the power source into a first output power at a first output voltage during normal operation of the power supply system;

convert power supplied by the power source into a second output power at either the first output voltage or a second output voltage in response to a first control signal, wherein the second output power is non-zero and less than or equal to the first output power and wherein the second output voltage is less than the first output voltage;

supply one of the first output power and the second output power to the first output port; and a second power converter operably coupled to a second output port of the plurality of output ports, the second power converter operable to:

convert power supplied by the power source into a third output power at a third output voltage during normal operation of the power supply system;

convert power supplied by the power source into a fourth output power at either the third output voltage or a fourth output voltage in response to a second control signal, wherein the fourth output power is non-zero and less than the third output power and wherein the fourth output voltage is less than the third output voltage; and supply one of the third output power and the fourth output power to the second output port;

an output characteristic monitoring circuit coupled to an output of the power source, the output characteristic monitoring circuit being operable to monitor at least one output characteristic of the power source and produce an output voltage responsive thereto;

a differential amplifier circuit coupled to the output characteristic monitoring circuit and operable to produce an output voltage corresponding to a difference between the output voltage produced by the output characteristic monitoring circuit and a reference voltage;

a first voltage-controlled resistance circuit coupled to an output of the differential amplifier circuit and to a power control input of the first power converter, the first voltage-controlled resistance circuit being operable to select a resistance applied to the power control input of the first power converter based on the output voltage of the differential amplifier circuit, the power control input of the first power converter controlling an amount of output power supplied by the first power converter, wherein the output voltage of the differential amplifier circuit is indicative of whether an overload condition is being approached based on the at least one output characteristic of the power source, and wherein current flowing through the selected resistance applied to the power control input of the first power converter generates the first control signal; and a second voltage-controlled resistance circuit coupled to the output of the differential amplifier circuit and to a power control input of the second power converter, the second voltage-controlled resistance circuit being operable to select a resistance applied to the power control input of the second power converter based on the output voltage of the differential amplifier circuit, the power control input of the second power converter controlling an amount of output power supplied by the second power converter, wherein current flowing through the selected resistance applied to the power control input of the second power converter generates the second control signal.

* * * * *